United States Patent Office 3,567,773
Patented Mar. 2, 1971

3,567,773
PRODUCTION OF UNSATURATED
ALIPHATIC ACIDS
Goichi Yamaguchi and Shigeo Takenaka, Gunmaken, Japan, assignors to Nippon Kayaku Company, Ltd., Tokyo, Japan
No Drawing. Filed Mar. 29, 1967, Ser. No. 626,712
Claims priority, application Japan, May 21, 1966, 41/32,060
Int. Cl. C07c 51/26
U.S. Cl. 260—530      4 Claims

ABSTRACT OF THE DISCLOSURE

The vapor phase oxidation of olefinically unsaturated aldehydes such as acrolein to the corresponding olefinically unsaturated carboxylic acids such as acrylic acid in the presence of a mechanically stable oxidation catalyst composed of a form of the combined oxides of molybdenum, vanadium and tungsten, which catalyst is preferably on a silica carrier.

---

The present invention relates to a process for the production of unsaturated aliphatic acids by vapor phase oxidation of the corresponding unsaturated aliphatic aldehydes with molecular oxygen in the presence of steam over an oxidation catalyst having the following formula:

$$Mo_a V_b W_c O_d$$

wherein $a$, $b$, $c$ and $d$ represent the number of atoms of molybdenum, vanadium, tungsten and oxygen, respectively, and when $a$ is 12, $b$ is 0.5–12, $c$ is 0.1–6 and $d$ is 37–84.

Recently patents such as Japanese Patents No. 40/22,850, No. 41/1,775 and No. 41/6,262, relating to the process for the production of acrylic acid by oxidation of acrolein have been issued. Among these patents, the catalysts primarily composed of an oxide of molybdenum combined with vanadium show improved yields of acrylic acid.

For the purposes of the present invention the terms conversion, selectivity and single pass yield are defined as follows:

$$\text{Conversion (percent)} = \frac{\text{Mols of unsaturated aliphatic aldehyde converted}}{\text{Mols of unsaturated aliphatic aldehyde fed}} \times 100$$

$$\text{Selectivity (percent)} = \frac{\text{Mols of unsaturated aliphatic acid obtained}}{\text{Mols of unsaturated aliphatic aldehyde converted}} \times 100$$

$$\text{Single pass yield (percent)} = \frac{\text{Mols of unsaturated aliphatic acid obtained}}{\text{Mols of unsaturated aliphatic aldehyde fed}} \times 100$$

$$= \text{Conversion} \times \text{Selectivity}$$

In the process disclosed in Japanese Patent No. 40/22,850, the catalyst is prepared from substance composed of oxides of antimony and iron by dipping in aqueous solution of ammonium paramolybdate and ammonium metavanadate, and calcining. The highest single pass yield of acrylic acid disclosed in this reference is 82.7% based on acrolein fed. The yield of acrylic acid is good, but the process of preparing the catalyst is quite complicated, and it is not easily reproduced. Furthermore, the commercial scale control of form and size of catalyst granules by this prior art process is difficult, and the mechanical strength of the finished catalyst is not acceptable.

In the process disclosed in Japanese Patent No. 41/1,775, a catalyst composed of oxides of molybdenum and vanadium deposited on silica gel is described. The catalyst of this reference has no such defects as described above, but the highest single pass yield of acrylic acid disclosed is 76% based on acrolein fed.

In the process disclosed in Japanese Patent No. 41/6,262, the catalyst disclosed is composed of oxides of molybdenum, vanadium and phosphoric acid deposited on aluminum sponge, and the highest single pass yield of acrylic acid described in this reference is 62.5% based on acrolein fed.

The catalyst used in the process of the present invention is composed of oxides of molybdenum, vanadium and tungsten deposited on silica gel. Single pass yields of acrylic acid from acrolein in the order of 89% are attainable in the process of the present invention.

In the process of the present invention, yields of acrylic acid are excellent. Moreover, the preparatiton of the catalyst is quite simple and easily performed as more fully disclosed below. Mechanical strength of the catalyst, which is preferably on from 35% to 70% by weight of silica gel carrier, is excellent.

In the process of the present invention, suitable unsaturated aliphatic aldehydes as starting materials for the production of unsaturated aliphatic acids are acrolein and methacrolein, and acrolein is particularly suitable.

The catalyst of this invention is usually prepared by mixing aqueous solutions of water-soluble salts of molybdenum, vanadium and tungsten such as ammonium paramolybdate, ammonium metavanadate and ammonium paratungstate. Silica sol or silica gel is added to the resulting solution, and the resulting slurry is then heated to remove water and dry the solid cake which forms. The solid cake is then pulverized, pelleted and heat treated at a high temperature in the presence of air.

The catalyst according to this invention is considered to be a mixture or compound of the oxides of molybdenum, vanadium and tungsten, but the exact structure of the catalyst is not known with any degree of certainty. The composition of the catalyst, whatever the true structure may be, can be represented by the following empirical formula:

$$Mo_a V_b W_c O_d$$

wherein $a$ is 12, $b$ is 0.5–12 and $c$ is 0.1–6. A particularly preferred catalyst for the purposes of this invention is that having the above formula in which $b$ is 1.5–5 and $c$ is 0.5–3. The number of atoms of oxygen or the number assigned to $d$ is determined by the valence requirements of Mo, V and W and is usually equal to $3a + 2.5b + 3c$.

The catalysts of this invention can be used without carrier, but the catalyst deposited on a carrier gives higher single pass yields of acrylic acid from acrolein and thus is a preferred composition. Among inactive carriers usually used in the catalyst art such as silicon carbide, alumina and silica, silica gives the best results. The catalyst containing 35–70% by weight of silica gives the highest single pass yield of acrylic acid from acrolein, excellent mechanical strength, and no falling off of catalyst from carrier and can be pelleted easily and thus can be used successfully in a commercial process.

The catalyst of this invention is equally suitable for use in a fixed bed reactor, in a fluidized bed reactor or in a moving bed reactor.

The catalytic oxidation process of the present invention is carried out at a temperature of from 200° C. to 350° C. and at a pressure of from 0.5 to 10 atmospheres.

The contact time of the mixture of unsaturated aliphatic aldehyde, air and steam with the catalyst is usually from 0.5 to 10 seconds.

The mol ratios of ingredients in the gaseous feed mixture preferably are from 0.5 to 4 mols of oxygen and from 1 to 20 mols of steam per mol of unsaturated aliphatic aldehyde.

In general, air is used as the source of molecular oxygen in the instant process; however, molecular oxygen per se or mixtures of oxygen and inert gases such as nitrogen, carbon dioxide, etc., may also be used.

The process of the present invention is further illustrated by the following examples.

EXAMPLE 1

42.4 grams of ammonium paramolybdate, 4.7 grams of ammonium metavanadate and 2.7 grams of ammonium paratungstate were each dissolved in distilled water, and all of the foregoing solutions were mixed.

To the resulting mixture were added 23.6 grams of silica in the form of silica sol. The resulting slurry was dried. The solid cake formed was pulverized by ball milling.

The catalyst pellets obtained from the resulting powder were calcined at 400° C. for five hours.

The composition of this catalyst was represented by the following formula:

$$Mo_{12}V_2W_{0.5}O_{42.5}$$

30 ml. of the catalyst were placed in a stainless steel reactor tube 20 mm. in diameter dipped in a molten potassium nitrate bath.

A gaseous mixture of 10 mols of air and 6 mols of steam per mol of acrolein was passed over the catalyst at a contact time of 2 seconds at a temperature of 220° C.

The result of the reaction was as follows:

| | Percent |
|---|---|
| Conversion of acrolein | 97.8 |
| Selectivity to acrylic acid | 89.0 |
| Single pass yield of acrylic acid | 87.0 |

EXAMPLES 2–6

The following catalysts shown in Table 1 were prepared by the same procedure described in Example 1 using the ingredients shown in Table 1. 30 ml. of each catalyst shown in Table 1 were placed in the same reactors as of Example 1, respectively.

The conditions of reactions were those of Example 1 except for the variation in bath temperatures shown in Table 2. The results of these reactions are shown in Table 2.

TABLE 1

| Example Number | Grams ammonium paramolybdate | Grams ammonium metavanadate | Grams ammonium paratungstate | Grams silica sol (as SiO$_2$) | Catalyst composition |
|---|---|---|---|---|---|
| 2 | 42.4 | 3.5 | 2.7 | 20 | Mo$_{12}$V$_{1.5}$W$_{0.5}$O$_{41}$ |
| 3 | 42.4 | 7.0 | 5.4 | 30 | Mo$_{12}$V$_3$W$_1$O$_{46}$ |
| 4 | 42.4 | 9.3 | 10.8 | 40 | Mo$_{12}$V$_4$W$_2$O$_{52}$ |
| 5 | 42.4 | 11.6 | 10.8 | 40 | Mo$_{12}$V$_5$W$_2$O$_{54.5}$ |
| 6 | 42.4 | 7.0 | 6.1 | 30 | Mo$_{12}$V$_3$W$_{1.2}$O$_{47.1}$ |

TABLE 2

| Example Number | Catalyst composition | Temperature of bath, °C. | Percent conversion of acrolein | Percent selectivity to acrylic acid | Percent single pass yield of acrylic acid |
|---|---|---|---|---|---|
| 2 | Mo$_{12}$V$_{1.5}$W$_{0.5}$O$_{41}$ | 235 | 95.5 | 87.8 | 83.8 |
| 3 | Mo$_{12}$V$_3$W$_1$O$_{46}$ | 239 | 95.8 | 89.0 | 85.3 |
| 4 | Mo$_{12}$V$_4$W$_2$O$_{52}$ | 242 | 95.8 | 86.9 | 83.2 |
| 5 | Mo$_{12}$V$_5$W$_2$O$_{54.5}$ | 246 | 95.6 | 86.9 | 83.1 |
| 6 | Mo$_{12}$V$_3$W$_{1.2}$O$_{47.1}$ | 240 | 98.0 | 90.8 | 89.0 |

We claim:
1. The process for the production of unsaturated aliphatic acids by vapor phase catalytic oxidation of corresponding unsaturated aliphatic aldehydes with molecular oxygen in the presence of steam in a ratio of from 0.5 to 4 moles of oxygen and from 1 to 20 moles of steam per mole of aldehyde, said reaction mixture being passed over an oxidation catalyst represented by the following formula:

$$Mo_aV_bW_cO_d$$

wherein $a$ is 12, $b$ is 0.5 to 12, $c$ is 0.1 to 6, and $d$ is 37 to 84 at a temperature of from about 200°C. to 350° C. and a pressure of from about 0.5 to 10 atmospheres.

2. The process of claim 1 wherein $a$ is 12, $b$ is 1.5 to 5, $c$ is 0.5 to 2 and $d$ is 41.3 to 54.5.

3. The process of claim 1 wherein the carrier is silica.

4. The process of claim 1 wherein the unsaturated aliphatic acid is acrylic acid and the unsaturated aliphatic aldehyde is acrolein.

References Cited

UNITED STATES PATENTS

| 3,450,172 | 10/1968 | Brown et al. | 260—530U |
| 3,409,665 | 11/1968 | Brown et al. | 260—530U |

FOREIGN PATENTS

| 903,034 | 8/1962 | Great Britain | 260—530U |
| 1,387,693 | 12/1964 | France | 260—530U |

LORRAINE A. WEINBERGER, Primary Examiner

D. STENZEL, Assistant Examiner

U.S. Cl. X.R.

252—456, 467